(12) United States Patent
Kinugawa et al.

(10) Patent No.: US 6,756,904 B2
(45) Date of Patent: Jun. 29, 2004

(54) DEVICE FOR PURIFYING EXHAUST GAS OF ENGINES

(75) Inventors: Masumi Kinugawa, Okazaki (JP); Kiyonori Sekiguchi, Okazaki (JP); Tatsuya Fujita, Susono (JP)

(73) Assignee: Denso Corporation, Aichi (JP)

( * ) Notice: Subject to any disclaimer, the term of this patent is extended or adjusted under 35 U.S.C. 154(b) by 0 days.

(21) Appl. No.: 10/173,392

(22) Filed: Jun. 18, 2002

(65) Prior Publication Data
US 2002/0196153 A1 Dec. 26, 2002

(30) Foreign Application Priority Data
Jun. 18, 2001 (JP) ........................................ 2001-182869

(51) Int. Cl.[7] .............................................. G08B 21/00
(52) U.S. Cl. ........................ 340/606; 340/607; 340/439; 73/118.2
(58) Field of Search ................................ 340/439, 438, 340/606, 607; 73/118.2, 118.1; 60/274, 286, 288, 311

(56) References Cited

U.S. PATENT DOCUMENTS

| | | | |
|---|---|---|---|
| 4,361,028 A | * | 11/1982 | Kamiya et al. ................. 73/28 |
| 5,177,464 A | * | 1/1993 | Hamburg ..................... 340/439 |
| 5,239,861 A | * | 8/1993 | Fujita ......................... 73/61.73 |
| 5,267,467 A | * | 12/1993 | Caron ............................ 73/3 |
| 5,604,306 A | * | 2/1997 | Schricker .................... 340/607 |
| 6,377,171 B1 | * | 4/2002 | Fewel ......................... 340/522 |

FOREIGN PATENT DOCUMENTS

| | | |
|---|---|---|
| JP | 60-47937 | 3/1985 |
| JP | 1-253522 | 10/1989 |

* cited by examiner

Primary Examiner—Anh V. La
(74) Attorney, Agent, or Firm—Nixon & Vanderhye PC

(57) ABSTRACT

The permeability of a DPF 21 mounted on a diesel engine 1 is evaluated by calculating the apparent passage area (A) based upon a difference in the pressure between the upstream and the downstream sides of the DPF 21 and upon other engine data, an alarm is given to a driver based on the results of evaluation, and the operation mode is changed over to regenerate the DPF 21. An abnormal increase in the passage area caused by breakage is accurately detected, and it does not happen that the PM is released into the open air for extended periods of time due to the breakage of the DPF 21. Further, without the need of dismantling the DPF 21, the DPF 21 can be reliably burned and regenerated without being undesirably overheated in every operation mode of the engine 1.

11 Claims, 14 Drawing Sheets

DEVICE FOR PURIFYING EXHAUST GAS OF ENGINES

BACKGROUND OF THE INVENTION

1. Field of the Invention

The present invention relates to a device for purifying the exhaust gas of an automotive engine. More particularly, the invention relates to a device for purifying exhaust gas of an engine in which a permeability of a particulate filter mounted on a diesel engine is evaluated by calculating the apparent passage area based upon a difference in the pressure between the upstream and the downstream sides of the particulate filter and upon other engine data, an alarm is given to a driver based on the results of evaluation, and the particulate filter is properly regenerated.

2. Description of the Related Art

In order to prevent air pollution, there has heretofore been widely used a particulate filter for trapping particulate matter emitted from automotive engines and, particularly, from diesel engines. Particulate filters of a variety of types have been proposed. Among them, the particulate filter of the type which automatically burns the particulate matter which it has trapped, so as to be regenerated without the need of dismantling it, is simple in constitution and is very desirable. When the particulate matter is deposited to an excess degree, the particulate filter of this type loses the permeability in the exhaust gas passage, causing an undesired drop in the engine output and an increased emission of smoke. It is therefore necessary to properly execute the regeneration processing while monitoring the permeability of the particulate filter at all times. If the particulate filter breaks, particulate matter is released to the open air. It is therefore necessary to detect abnormal permeability of the particulate filter and to turn an alarm lamp on to let the driver know this fact to allow him to have the particulate filter repaired.

As a method of monitoring the permeability of the particulate filter, there has been known a method of monitoring the differential pressure between the upstream and the downstream sides of the particulate filter by using a differential pressure sensor (pre-exhaust gas sensor and post-exhaust gas sensor). As a method featuring a higher precision, Japanese Unexamined Patent Publication (Kokai) No. 60-47937 proposes a method of finding an apparent passage area from such data as flow rate of the air taken in by the engine, exhaust gas temperature and exhaust gas pressure relying upon the Bernoulli's flow formula. The method disclosed in Japanese Unexamined Patent Publication (Kokai) No. 60-47937 features high precision compared to that of the method which simply monitors the differential pressure. When it is attempted to detect the exhaust gas pressure and the differential pressure between the upstream and the downstream of the particulate filter in an averaged manner, however, an averaging error occurs due to pulsation in the exhaust pipe resulting in a decrease in the precision.

FIG. 17 is a diagram illustrating an averaging error that occurs when it is attempted to find an average value of the pressure signals in the presence of the pressure pulsation. There exists a secondary functional relationship between the exhaust gas flow rate (G) and the differential pressure (Δ) between the upstream and the downstream of the particulate filter. When there exists pulsation, the average values thereof deviate from a static secondary functional relationship to develop an average error. That is, even though it is attempted to find a differential pressure (Δ) between the upstream and the downstream sides of the particulate filter corresponding to the average value of the exhaust gas flow rate (G), the value that is obtained tends to become large and involve an error. Even though it is attempted to effect the on-board diagnosis (OBD) function, therefore, it is not possible to detect the values when the apparent passage area is abnormally large or it is not possible to change, while maintaining a sufficient degree of reliability, the method of burning the particulate matter and regenerating the particulate filter in compliance with a decrease in the apparent passage area.

SUMMARY OF THE INVENTION

It is an object of the present invention to provide a device, for purifying exhaust gas of engines, which is capable of finding an apparent passage area of the particulate filter while maintaining a sufficiently high precision. The invention further provides a device for purifying exhaust gas of engines, which is capable of property regenerating the particulate filter. The invention further provides a device for purifying exhaust gas of engines capable of properly detecting the defective state such as breakage of the particulate filter to request the driver to have it repaired.

According to a first aspect of the present invention, the permeability of the particulate filter that traps particulate matter emitted from the automotive engine, is evaluated, i.e., the apparent passage area is calculated based upon the differential pressure between the upstream and the downstream of the particulate filter and upon a plurality of engine data, and alarm is produced when it is judged that the apparent passage area lies under predetermined conditions, making it possible to find the apparent passage area maintaining a sufficiently high precision and to precisely detect an abnormal increase in the passage area caused by a fault such as breakage of the particulate filter. Thus, the faulty state such as breakage of the particulate filter is properly detected and an alarm means is energized to request the driver to have the particulate filter repaired.

According to another aspect of the present invention, the permeability of the particulate filter that traps particulate matter emitted from the automotive engine is evaluated, i.e., the apparent passage area is calculated based upon the differential pressure between the upstream and the downstream side of the particulate filter and upon a plurality of engine data, and an alarm is produced when it is judged that the apparent passage area is larger than a predetermined value or is smaller than a predetermined value, making it possible to accomplish the same effect as the one described above. According to the present invention, it is also judged whether the rate of increase in the apparent passage area is larger than a predetermined rate, making it possible to properly detect the faulty state where the particulate filter is broken with the particulate matter being deposited on the particulate filter.

According to a further aspect of the present invention, the permeability of the particulate filter is evaluated, i.e., the apparent passage area is calculated based upon the differential pressure between the upstream and the downstream sides of the particulate filter and upon a plurality of engine data, an instruction for regenerating the particulate filter is output when it is judged based on the apparent passage area that the particulate filter having particulate matter deposited thereon to be regenerated, and a regeneration end instruction is output for ending the processing for regenerating the particulate filter when it is confirmed that the regeneration of the particulate filter has been finished, making it possible to reliably regenerate the particulate filter without the need of dismantling the particulate filter and without causing the particulate filter to be excessively heated, which is undesirable.

According to a still further aspect of the present invention, an average error caused by the pulsation of the exhaust gas pressure is corrected at the time of finding the apparent passage area by utilizing the differential pressure between the upstream and the downstream sides of the particulate filter, making it possible to improve the precision for calculating the apparent passage area, to find the apparent passage area maintaining a sufficient precision and to precisely detect an abnormal increase in the passage area caused by the breakage of the particulate filter. This prevents such an occurrence that the particulate matter is emitted to the open air for extended periods of time as a result of the breakage of the particulate filter.

According to a yet further aspect of the present invention, three or more data are selected as a plurality of engine data out of the flow rate of the air taken in by the automotive engine, exhaust gas temperature, temperature of the particulate filter, atmospheric pressure and flow rate of the fuel. Under the conditions where the flow rate of the air taken in by the automotive engine is small such as under an idling condition, the differential pressure between the upstream and the downstream sides of the particulate filter becomes very small, and the apparent passage area is not found sufficiently precisely. According to a further aspect of the present invention, therefore, a step for calculating the apparent passage area is discontinued when the flow rate of the air taken in by the engine is smaller than a predetermined value.

According to another aspect of the present invention, provision is made of operation condition change-over means for changing over the operation conditions of an automotive engine toward a direction in which the exhaust gas temperature is elevated and the particulate filter is heated in response to an instruction for regenerating the particulate filter, and, when it is confirmed that the processing for regenerating the particulate filter is finished, an instruction is given to the operation condition change-over means so as to return the operation conditions of the automotive engine back to the initial operation conditions. Usually, therefore, the automotive engine is operated under the conditions of good fuel efficiency maintaining the exhaust gas temperature low, making it possible to save the fuel.

According to a further aspect of the present invention, if the particulate filter is heated at a temperature at which the particulate matter oxidizes and burns quickly under a condition where it is so judged that a large amount of particulate matter has been deposited, then, the particulate matter may burn rapidly causing the particulate filter to be overheated. When a first instruction output means has detected an extreme drop in the apparent passage area, therefore, the operating conditions are so changed as to heat the particulate filter at a temperature at which the particulate matter deposited on the particulate filter mildly reacts, in order to mildly regenerate the particulate filter without causing the particulate filter to be overheated.

The present invention may be more fully understood from the description of preferred embodiments of the invention as set forth below together with the accompanying drawings.

BRIEF DESCRIPTION OF THE DRAWINGS

FIG. 15 is a flowchart illustrating a fault-alarming method which detects the faulty state of the particulate filter (DPF) from the apparent passage area of the DPF and turns an alarm lamp on;

DESCRIPTION OF THE PREFERRED EMBODIMENTS

Constitution of the Embodiment

Figure 1:
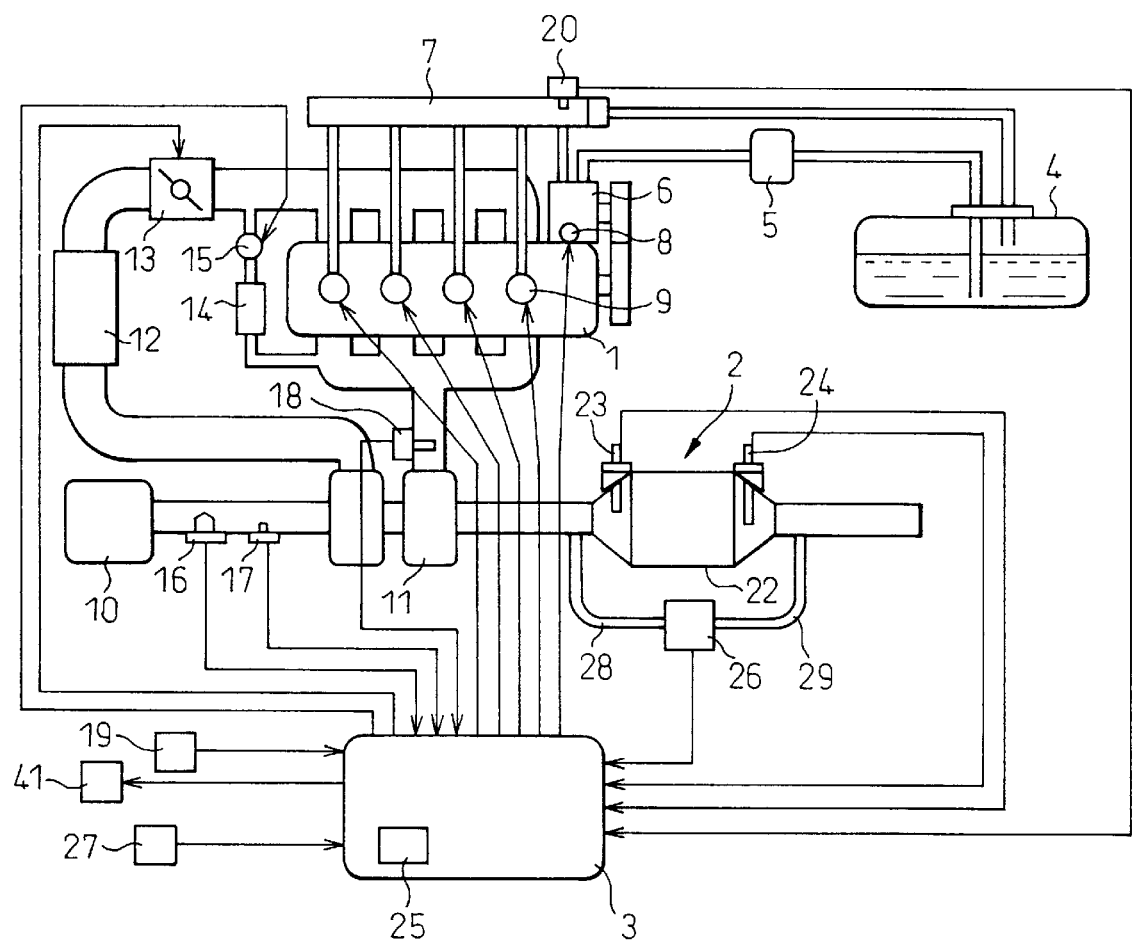
FIG. 1 is a diagram schematically illustrating the whole constitution of a system for controlling a diesel engine according to an embodiment of the present invention.

An embodiment of the present invention will now be described with reference to the drawings. FIG. 1 is a diagram illustrating the whole constitution of a system for controlling a diesel engine.

The system for controlling the diesel engine according to this embodiment includes a common rail-type fuel injection device for injecting the fuel into the combustion chambers in the cylinders of an automotive engine and, particularly, of a diesel engine (hereinafter simply referred to as engine) 1, and a device 2 for purifying exhaust gas emitted from the diesel engine (hereinafter abbreviated as the device for purifying exhaust gas), which comprises a particulate filter which carries an oxidizing catalyst for oxidizing carbon monoxide (CO) and hydrocarbons (HC) in the exhaust gas emitted from the engine 1 to purify them into harmless carbon dioxide ($CO_2$) and water vapor ($H_2O$).

The common rail-type fuel injection device for the diesel engine detects the operation conditions of the engine, traveling conditions of the vehicle and operation quantities by the driver by using various sensors, transmits these data to an electronic control unit (ECU) 3, calculates an optimum amount of injection and an optimum injection timing relying upon the data from the sensors, and gives instructions to the actuators for executing the controls. In the fuel delivery system of the common rail-type fuel injection device, there are arranged a fuel injection pump (high-pressure feed pump) 6 which contains a feed pump that pumps, through a fuel filter 5, the fuel in the fuel tank 4 mounted on the vehicle, pressurizes the fuel that is pumped by the feed pump and feeds the highly pressurized fuel, and a common rail 7 which is a pressure-accumulating chamber for accumulating the high-pressure fuel fed by the high-pressure feed pump 6.

An amount-adjusting electromagnetic valve 8, which is an actuator mounted on the high-pressure feed pump 6, is electronically controlled by a control signal from the ECU 3 so as to adjust the amount of feeding the high-pressure fuel from the high-pressure feed pump 6 into the common rail 7 through a pipe, thereby to change the pressure for injecting the fuel (common rail pressure). Here, the fuel in the fuel tank 4 is pumped up by the high-pressure feed pump 6 through the fuel filter 5 and is fed to the common rail 7 with the application of pressure. The fuel pressure in the common rail 7 is detected by a fuel pressure sensor 20 mounted on the common rail 7, and is adjusted by controlling the amount-adjusting electromagnetic valve 8 mounted on the high-pressure feed pump 6 by the ECU 3 depending upon the operation conditions.

The high-pressure fuel is distributed to a plurality of fuel injection valves (hereinafter referred to as injectors) 9 mounted right on the combustion chambers of the cylinders of the engine 1. The injectors 9 are connected to the common rail 7 through pipes. In response to an instruction signal found based upon the required torque (T) of the engine calculated from the accelerator opening signal (ACCP) and the engine rotational speed (Ne), the ECU 3 works to inject the high-pressure fuel into the combustion chambers of the cylinders of the engine 1 at predetermined injection timings (θ) maintaining predetermined injection quantities (qf) to realize optimum combustion. The amount of fuel injection increases with an increase in the time for maintaining the injector 9 opened, and decreases with a decrease in the time for maintaining the injector 9 opened.

The air to be taken in by the engine is sucked through an air cleaner 10, pressurized by a turbo charger 11, passed through an inter-cooler 12, an intake throttle valve 13, intake pipes of the cylinders and is taken in by the engine 1. The exhaust gas formed by the combustion in the engine 1 is emitted into the exhaust pipe. The exhaust gas emitted into the exhaust pipe is released after having done the job of pressurizing the intake air in the turbo charger, i.e., released into the open air passing through the device (catalytic converter) 2 for purifying the exhaust gas.

Here, the system for controlling the diesel engine of this embodiment is equipped with an exhaust gas recirculating device which recirculates part (EGR gas) of the exhaust gas emitted from the engine 1 into the intake air passage in the intake pipe to decrease harmful substances (e.g., nitrogen oxides: NOx) contained in the exhaust gas. Therefore, part of the exhaust gas is recirculated (refluxed) into the intake pipe passing through an EGR cooler 14 and an EGR valve 15. The flow rate of recirculating (EGR) the exhaust gas is controlled as the ECU 3 collects a plurality of engine data, finds an optimum EGR gas flow rate based upon these signals, and adjusts the EGR valve 15 and the intake throttle valve 13.

The opening degree of the EGR valve is controlled by feedback and is finely adjusted in response to a signal from an oxygen concentration (λ) sensor 18 mounted on the exhaust pipe so as to attain a target concentration λ ($O_2$ concentration). The plurality of engine data include data from an air flow meter (intake air amount detector means) 16 for detecting the amount of the air taken in by the engine 1, an intake air temperature sensor 17 for detecting the temperature of the air taken in by the engine 1, an oxygen concentration sensor ($O_2$ sensor) for detecting the concentration of oxygen in the exhaust gas emitted from the engine 1, an accelerator opening sensor 19 for detecting the amount the accelerator pedal is depressed (accelerator opening degree: ACCP), an engine rotational speed sensor (not shown) for detecting the engine rotational speed (Ne), and an intake air pressure sensor (not shown) for detecting the pressure of the air taken in by the engine 1.

Figure 2:
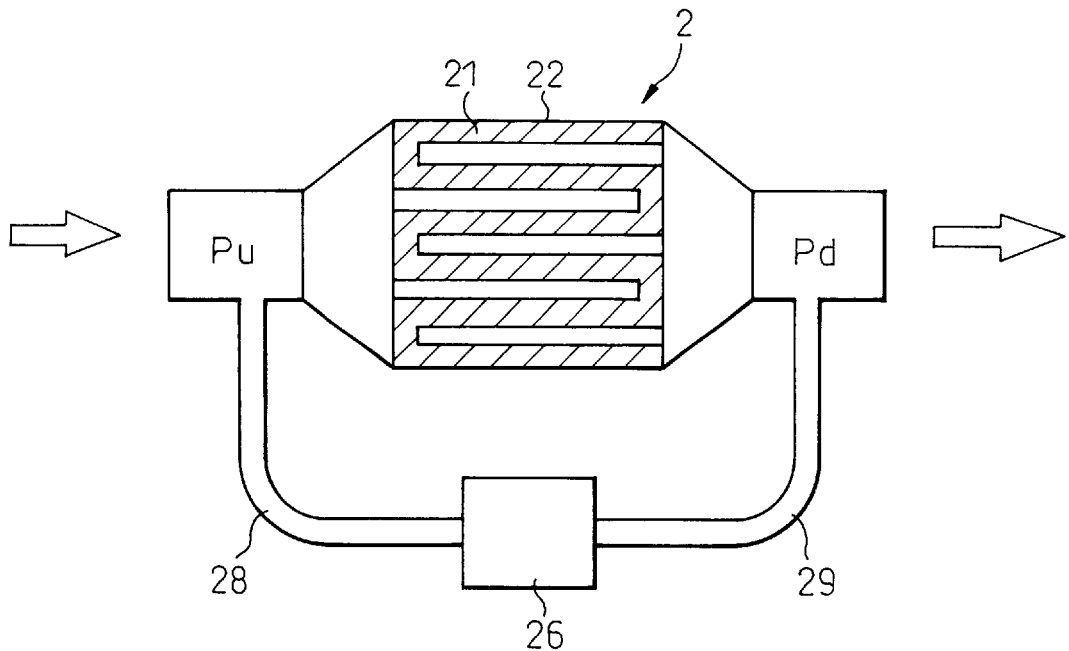
FIG. 2 is a diagram schematically illustrating the details of a device for purifying exhaust gas.

Next, the structure of the device 2 for purifying exhaust gas of this embodiment will be briefly described with reference to FIGS. 1 and 2. FIG. 2 is a diagram illustrating, in detail, the device 2 for purifying exhaust gas.

The device 2 for purifying exhaust gas has a particulate filter (hereinafter referred to as DPF) 21 carrying the catalyst, which is held in a metal casing (catalyst container) 22 which constitutes an exhaust gas passage. The DPF 21 is of the wall-flow type comprising porous ceramics coated on its surfaces with a catalyst, and traps particulate matter (hereinafter referred to as PM) constituted by fine particles (chief components are high molecular hydrocarbons (HCs) such as carbon soot, unburned fuel, engine oil, etc.) emitted from the engine 1. As the DPF 21, there may be used a ceramic honeycomb filter, a foam filter or a fiber filter. There may be further used a metal filter.

In the metal casing 22, there are provided an upstream portion of a conical cylindrical shape on which is mounted a first exhaust gas temperature sensor 23 that will be described later, a cylindrical holding portion for holding the DPF 21 therein, and a downstream portion of a conical cylindrical shape on which is mounted a second exhaust gas temperature sensor 24 that will be described later. The exhaust gas flows in the direction of the arrow. Guide holes are perforated at positions upstream and downstream of the DPF 21 for detecting the pressures, are connected to an upstream-downstream differential pressure sensor (upstream-downstream differential pressure detector means) 26 through pipes 28 and 29, and work to transmit a pressure (Pu) upstream of the DPF 21 and a pressure (Pd) downstream of the DPF 21.

The first exhaust gas temperature sensor 23 is mounted just on the upstream of the DPF 21 to detect the temperature of the exhaust gas (catalyst temperature) just on the upstream of the DPF 21. The second exhaust gas temperature sensor 24 is mounted just on the downstream of the DPF 21 to detect the temperature of the exhaust gas (catalyst temperature) just on the downstream of the DPF 21. Exhaust gas temperature signals are sent to the ECU 3 from the exhaust gas temperature sensors 23 and 24. Further, holes are perforated upstream and downstream of the DPF 21 for taking out the pressure, and are connected to the upstream-downstream differential pressure sensor 26 through pipes. A signal of the upstream-downstream differential pressure sensor 26 is sent to the ECU 3.

Figure 3:
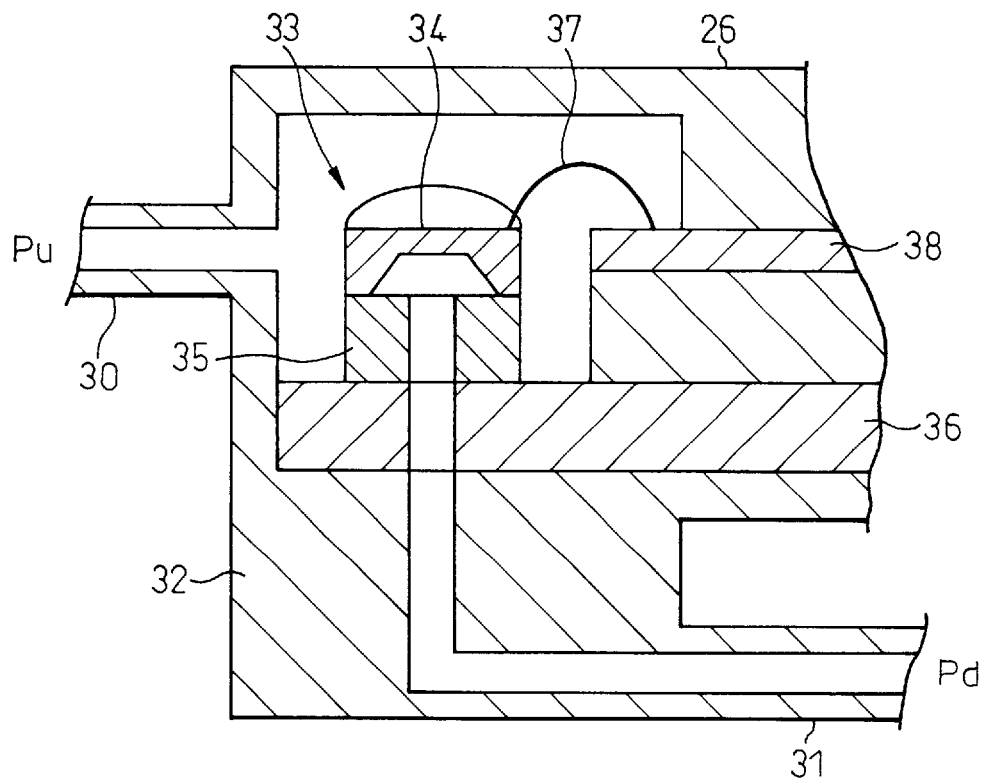
FIG. 3 is a diagram schematically illustrating major portions of an upstream-downstream differential pressure sensor.

Next, the structure of the upstream-downstream differential pressure sensor 26 of this embodiment will be briefly described with reference to FIGS. 1 and 3. Here, FIG. 3 is a diagram illustrating major portions of the upstream-downstream differential pressure sensor 26.

The upstream-downstream differential pressure sensor 26 is a permeability monitoring means for monitoring the permeability of the DPF 21, and is an upstream-downstream differential pressure detector means for detecting a difference in the pressure between the upstream and the downstream sides of the DPF 21. Pipes 28 and 29 are connected to pipes 30 and 31, so that the pressure (Pu) upstream of the DPF 21 and the pressure (Pd) downstream of the DPF 21 are guided into the housing 32. A differential pressure detector portion 33 of the upstream-downstream differential pressure sensor 26 is constituted by a semiconductor chip 34 having a thin diaphragm portion at the center. The semiconductor chip 34 is mounted on a glass seat 35 on a substrate 36, and is connected to the ECU 3 through a wire bonding 37 and a terminal 38. In the differential pressure detector portion 33 of the upstream-downstream differential pressure sensor 26, therefore, the diaphragm is distorted depending upon the difference between the pressure (Pu) upstream of the DPF 21 and the pressure (Pd) downstream of the DPF 21. Distortion of the diaphragm is converted into an electric signal (upstream-downstream differential pressure signal) which is then amplified and is sent to the ECU 3.

Figure 4:
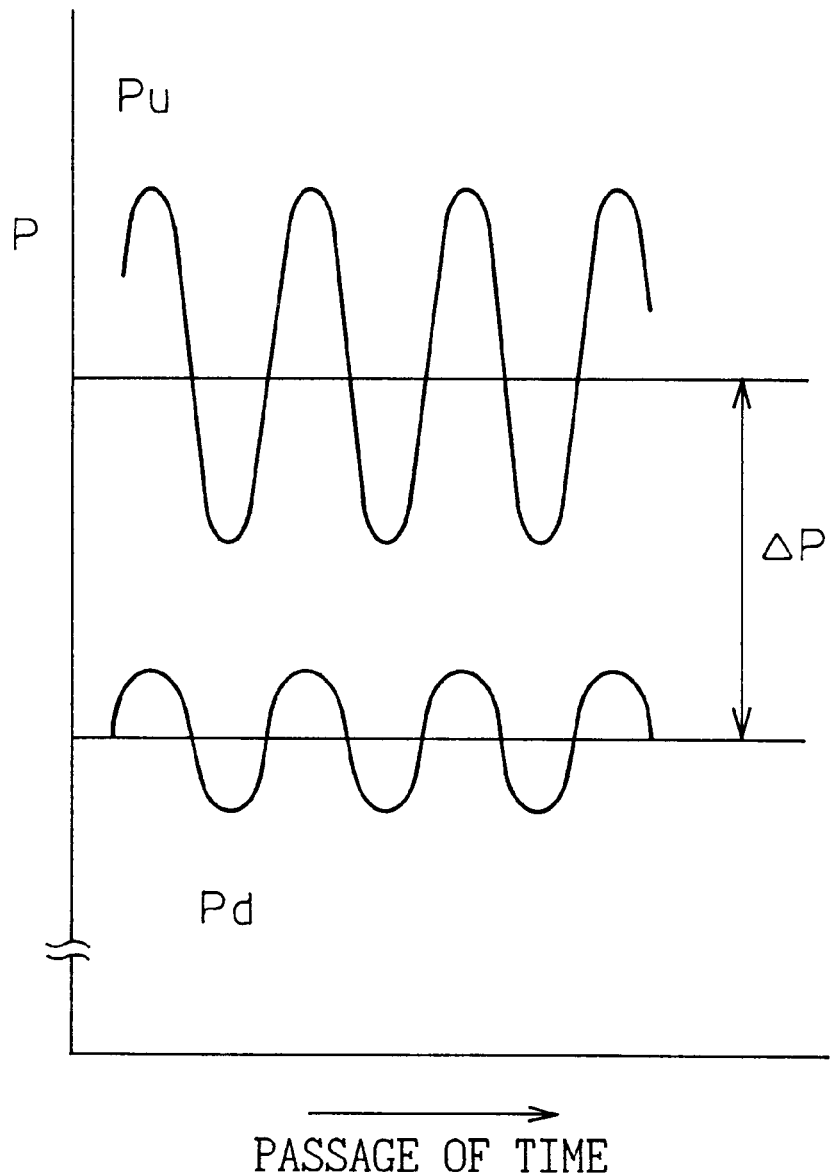
FIG. 4 is a timing chart showing the waveforms of pressures upstream and downstream of a particulate filter (DPF)

FIG. 4 is a diagram illustrating waveforms of the pressure (Pu) upstream of the DPF 21 and of the pressure (Pd) downstream of the DPF 21. At positions upstream and downstream of the DPF 21, there exists pulsation due to resonance phenomenon caused by the exhaust gas intermittently emitted by the engine 1 and the exhaust gas in the exhaust pipe. However, the pressure guided to the upstream-downstream differential pressure sensor 26 has a pulsation which is attenuated due to the volume in the upstream-downstream differential pressure sensor 26. After all, a difference in the average value is detected as a differential pressure ($\Delta$).

The ECU 3 corresponds to the engine data detector means, passage area calculation means, filter regeneration processing means (operation condition change-over means), first instruction output means and second instruction output means of the present invention, and contains a microcomputer constituted by a CPU for executing the control processing or arithmetic processing, a memory (RAM, ROM) for storing various programs and various data, a timer, I/O ports and the like functions.

The microcomputer in the ECU 3 receives a plurality of engine data from the accelerator opening sensor 19, air flow meter 16, intake air temperature sensor 17, engine rotational speed sensor, intake air pressure sensor, first exhaust gas temperature sensor 23 and second exhaust gas temperature sensor 24, as well as an upstream-downstream differential pressure signal of the DPF 21 from the upstream-downstream differential pressure sensor 26 after it is A/D converted through an A/D converter. The ECU 3 further receives a signal from the vehicle speed sensor 27 and turns an alarm lamp (alarm means) 41 on to let the driver know about a serious trouble in the control system. The ECU 3 further includes an atmospheric pressure sensor 25 for detecting the atmospheric pressure.

The device 2 for purifying exhaust gas of this embodiment has a device for automatically burning and regenerating the filter in a state in which the filter is being used without the need of dismantling the DPF 21 on which the PM is deposited. When the PM is deposited to an excess degree on the DPF 21 of the above-mentioned type, the exhaust gas passage loses the permeability, resulting in a decrease in the engine output and an increase in the emission of smoke which is harmful. In the device for regenerating the filter, therefore, the permeability of the DPF 21 is evaluated by calculating the apparent passage area (A) based on the difference in the pressure between the upstream and the downstream of the DPF 21 and on the plurality of engine data, and the DPF 21 is suitably regenerated relying upon the results of evaluation.

A concrete method of regeneration comprises elevating the temperature of the exhaust gas relying upon a post injection by injecting the fuel at a timing which, in terms of the crank angle, is behind the main injection separately from the main injection which is for producing an engine output, sending the unburned HC to the DPF 21 (filter regeneration processing means, operation condition change-over means), reacting them with the catalyst on the surface of the DPF 21 to further elevate the temperature, maintaining the DPF 2 at a temperature higher than a temperature at which the PM deposited on the DPF 21 is quickly oxidized and burned, thereby to conduct the processing for regenerating the DPF 21.

If the DPF 21 breaks, the PM is released into the atmosphere. Therefore, this embodiment further includes a device for alarming a fault in the filter by detecting the faulty state such as abnormal permeability of the DPF 21 based on the results of evaluation of the apparent passage area (A), and turning the alarm lamp 41 on to request the driver to have the FPF 21 repaired.

[Method of Control of the Embodiment]

A method of controlling the engine control system of this embodiment will be briefly described next with reference to FIGS. 1 to 12. Here, FIG. 5 is a flowchart illustrating a program for determining control values for the engine control system.

Figure 5:
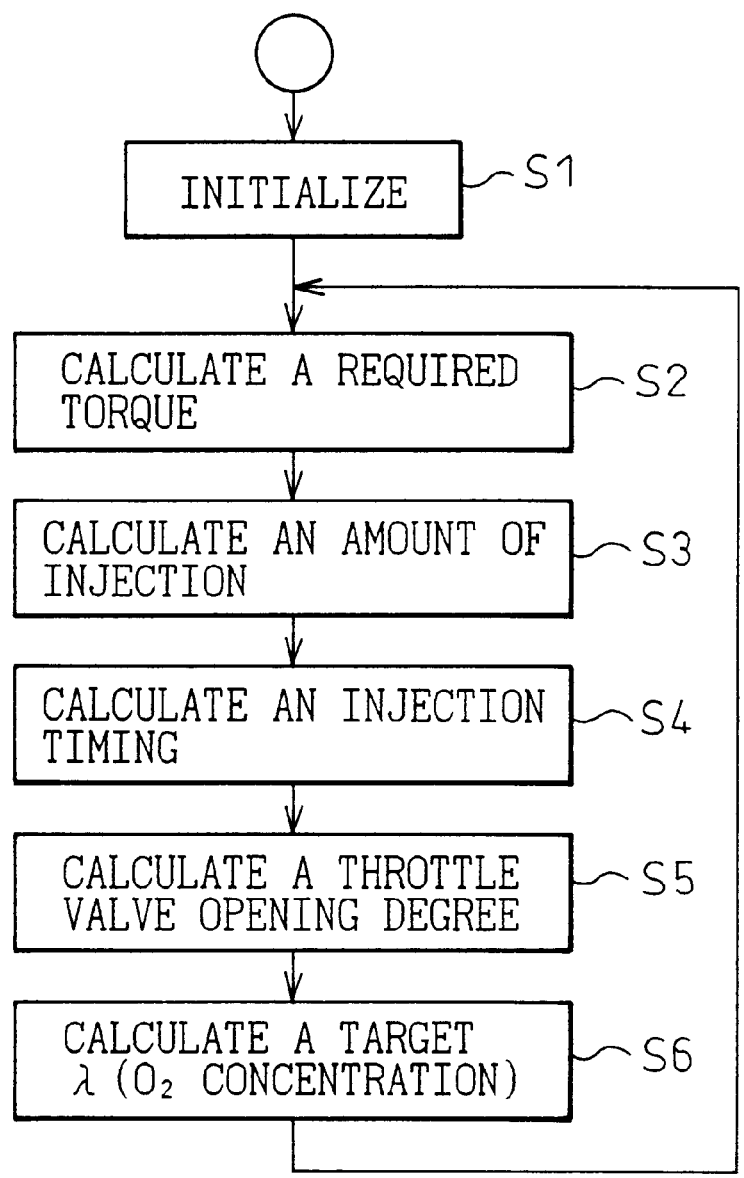
FIG. 5 is a flowchart of a program for determining control values of the system for controlling the engine.

The flowchart of FIG. 5 starts operating accompanying the start of the engine 1. First, a variety of data are initialized (step S1). Next, a required torque (T) of the engine is calculated from an accelerator opening degree (ACCP) detected by the accelerator opening sensor 19 and an engine rotational speed (Ne) detected by the engine rotational speed sensor (step S2). Then, an amount (qf) of injection is calculated from the accelerator opening degree (ACCP) detected by the accelerator opening sensor 19 and the engine rotational speed (Ne) detected by the engine rotational speed sensor (step S3).

Next, an injection timing ($\theta$) is calculated from the accelerator opening degree (ACCP) detected by the accelerator opening sensor 19 and the engine rotational speed (Ne) detected by the engine rotational speed sensor (step S4). Next, a throttle valve opening degree ($\alpha$) is calculated from the accelerator opening degree (ACCP) detected by the accelerator opening sensor 19 and the engine rotational speed (Ne) detected by the engine rotational speed sensor (step S5). Then, a target concentration $\lambda$ ($O_2$ concentration) is calculated from the accelerator opening degree (ACCP) detected by the accelerator opening sensor 19 and the engine rotational speed (Ne) detected by the engine rotational speed sensor (step S6). Thereafter, the processings of step S2 and subsequent steps are repeated. The target concentration $\lambda$ ($O_2$ concentration) is used for controlling, by feedback, the opening degree of the EGR valve 15 so that the predetermined target ($\lambda$) is assumed.

Figure 6:
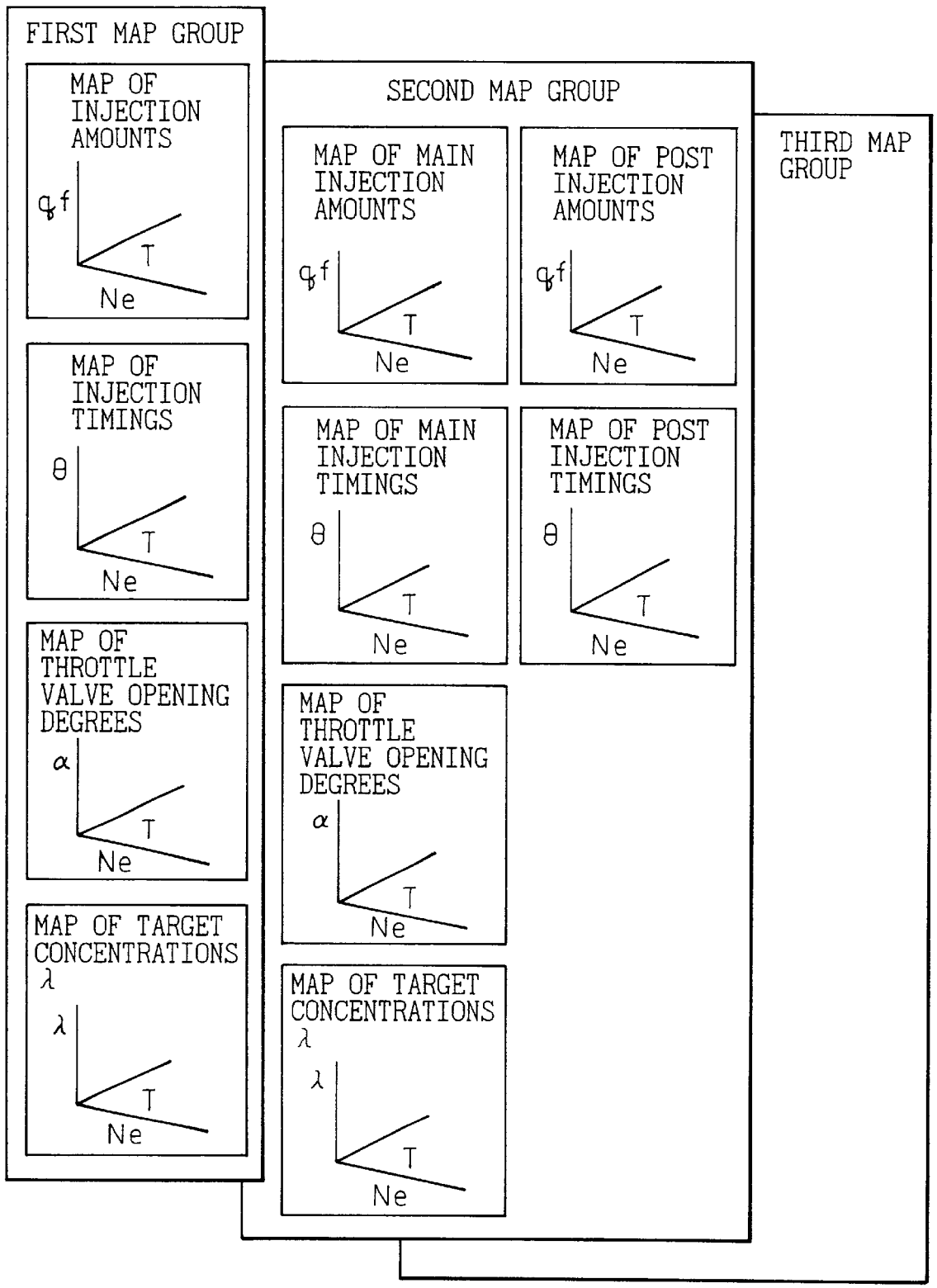
FIG. 6 is a diagram of characteristics illustrating first to third three map groups in which the control values are determined depending upon the engine rotational speeds and the required torques of the engine.

Next, FIG. 6 is a diagram illustrating first to third three map groups (engine operation conditions) in which the control values are determined depending upon the engine rotational speed (Ne) and the required torque (T) of the engine. In this embodiment, the map groups to be used are changed over depending upon the conditions that will be described later.

Figure 7:
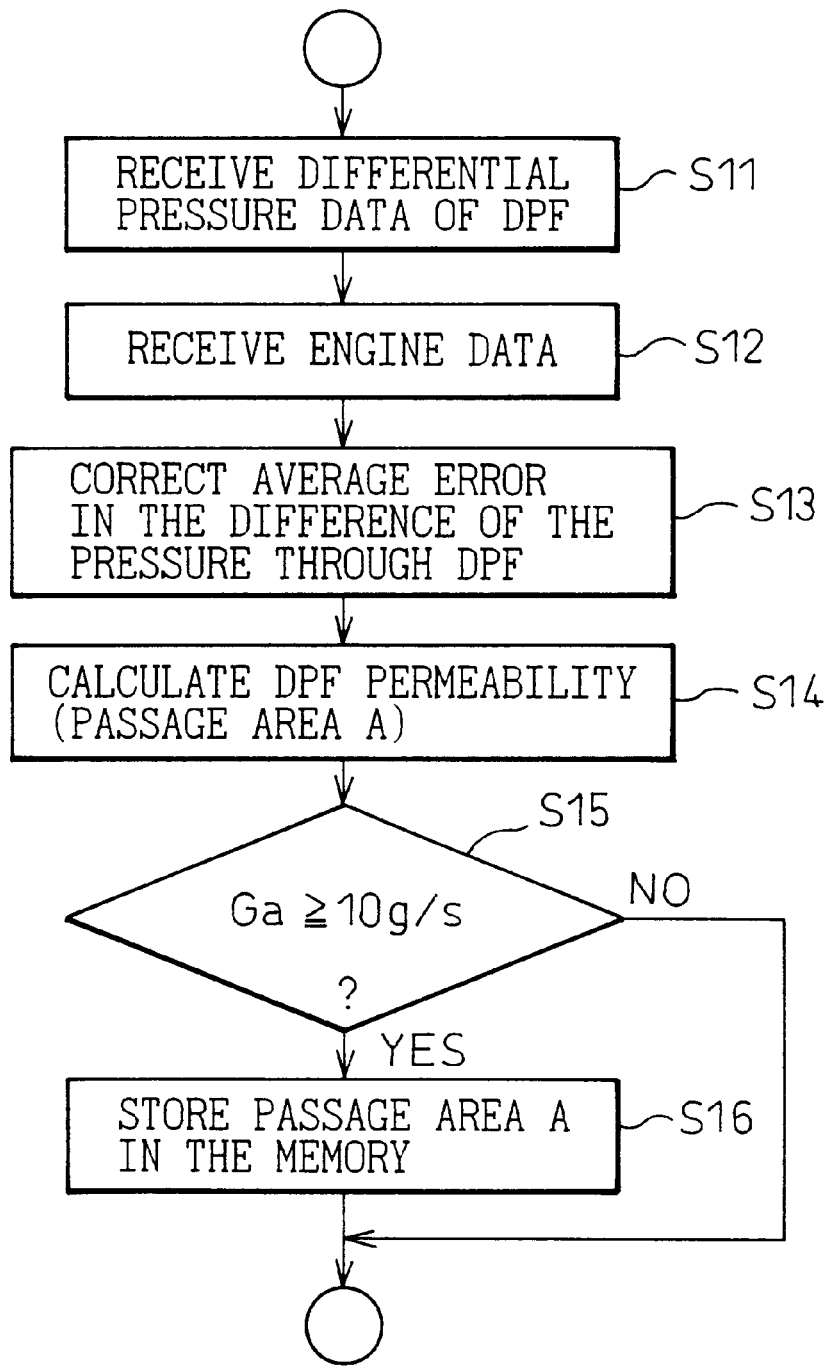
FIG. 7 is a flowchart of a program for calculating the apparent passage area of the particulate filter (DPF)
Figure 8:
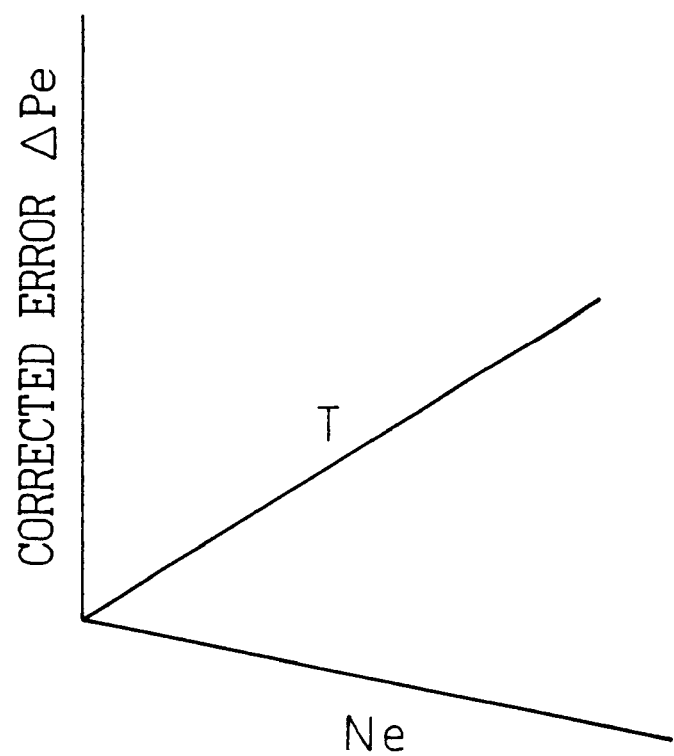
FIG. 8 is a diagram of characteristics illustrating a relationship among the required torque of the engine, the engine rotational speed and the corrected value of the average error.

FIG. 7 is a flowchart of a program for calculating the apparent passage area (A) of the DPF 21. First, the upstream-downstream differential pressure signal of the upstream-downstream differential pressure sensor 26 is read to receive the upstream-downstream differential pressure data of the DPF 21 (upstream-downstream differential pressure detector means: step S11). The upstream-downstream differential pressure signal from the upstream-downstream differential pressure sensor 26 may be the one which is averaged for a predetermined period of time.

Next, a plurality of engine data are received. Concretely, there are received a flow rate (Ga) of the air taken in by the engine 1 found from a signal of the air flow meter 16, an injection amount (qf), a fuel flow rate (Gf) found from the engine rotational speed (Ne), an exhaust gas temperature (Te) found from the signals of the first and second exhaust gas temperature sensors 23, 24, and an atmospheric pressure (Pa) found from a signal of the atmospheric pressure sensor 25 (engine data detector means: step S12).

Next, an average error in the differential pressure (Δ) between the upstream and the downstream of the DPF 21 is corrected (step S13). At positions upstream and downstream of the DPF 21, there exists pulsation due to resonance phenomenon caused by the exhaust gas intermittently emitted by the engine 1 and the exhaust gas in the exhaust pipe. The pulsating state varies depending upon the operation conditions of the engine 1. Corrected values (ΔPe) of average errors are given by using a map of required torques (T) of the engine and engine rotational speeds (Ne) as shown in a graph of FIG. 8, corrected values are found from this map, and correction is effected by (ΔP–ΔPe).

Then, permeability of the DPF 21 is calculated. Concretely speaking, the apparent passage area (A) of the DPF 21 is calculated in compliance with the formula 1 which is obtained by solving the flow formula found from Bernoulli's theorem (passage area calculation means: step S14). A is equal to a value obtained by multiplying the opening area by the flow coefficient in compliance with the flow formula.

$$A = \frac{Ga + Gf}{\sqrt{2g\gamma o Pa \frac{273}{273 + Te}(\Delta P - \Delta Pe)}} \quad (1)$$

where g is an acceleration due to gravity, and γo is a specific gravity of the exhaust gas in the standard state and is given in advance.

Though the atmospheric pressure was given to substitute for the exhaust gas pressure, it is also allowable to use the atmospheric pressure (Pa) by correcting it by the differential pressure (ΔP) between the upstream and the downstream of the DPF 21 or by the flow rate (Ga) of the intake air. The fuel flow rate (Gf) may not be added since the flow rate (Gf) is very much smaller than the flow rate (Ga) of the intake air. Further, the calculation in compliance with the formula (1) may be replaced by a method of finding the apparent passage area (A) by using several maps.

Next, it is judged whether the flow rate (Ga) of the air taken in by the engine 1 is larger than a predetermined value (e.g., 10 g/s)(step S15). When the judged result is NO, the apparent passage area (A) of the DPF 21 is not stored in the memory, and the routine gets out of the flowchart of FIG. 7. This is because under a condition where the flow rate (Ga) of the intake air is small, as near the idling condition, the differential pressure (ΔP) between the upstream and the downstream of the DPF 21 becomes very small, and the apparent passage area (A) of the DPF 21 is not obtained while maintaining a sufficient degree of precision. Therefore, only when the result judged at step S15 is YES, i.e., only when the flow rate (Ga) of the air taken in by the engine 1 is larger than a predetermined value, does the routine proceed to step S16 where the apparent passage area (A) found at step S14 is stored in the memory.

Figure 9:
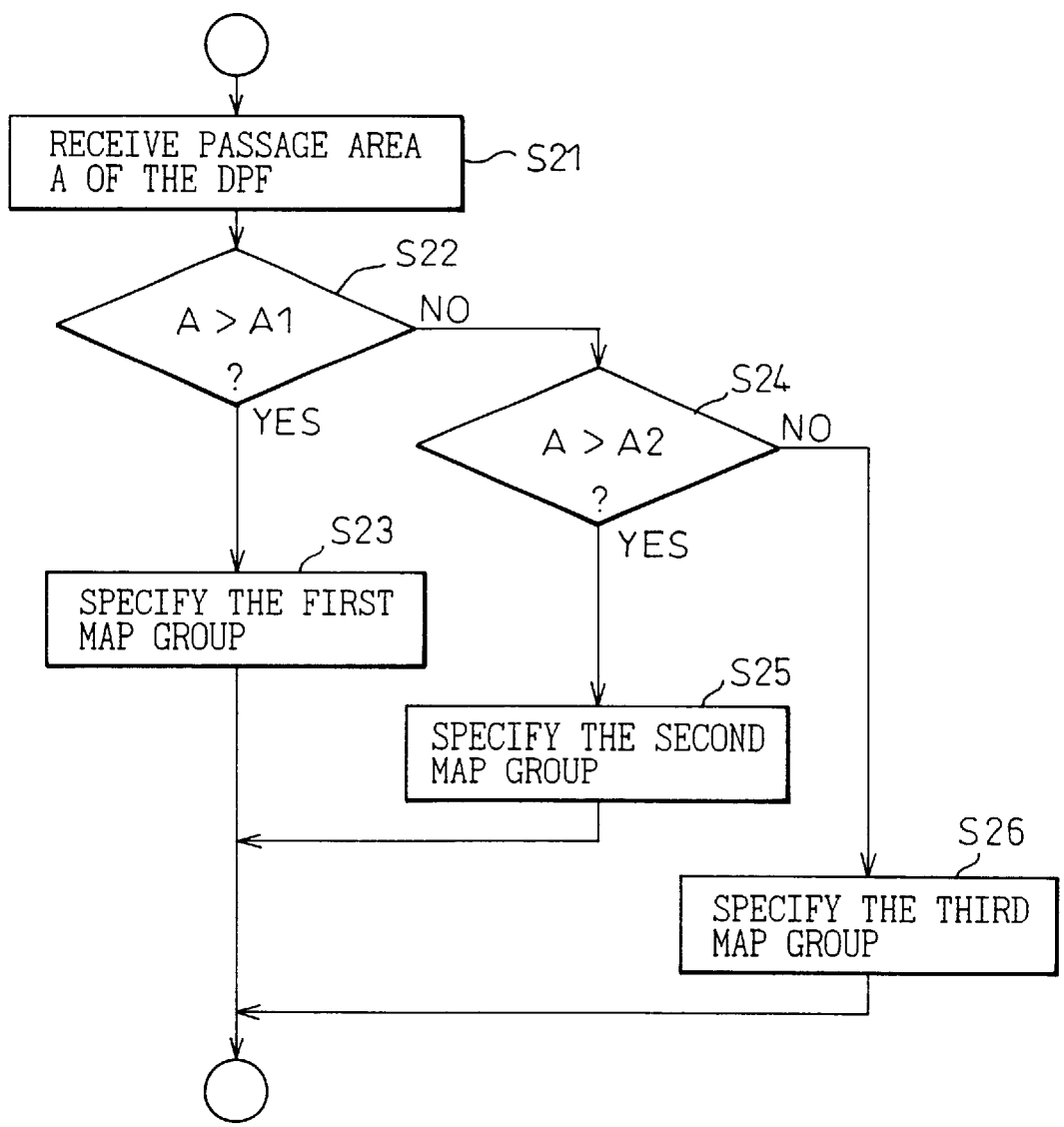
FIG. 9 is a flow chart of a program for regenerating the particulate filter (DPF)

Next, described below is a method of regenerating the DPF 21 upon detecting a decrease in the apparent passage area (A) of the DPF 21 due to the deposition of the PM on the DPF 21. FIG. 9 is a flowchart illustrating a program for regenerating the DPF 21.

First, the apparent passage area (A) of the DPF 21 found through the flowchart of FIG. 7 is received (step S21). Next, it is judged whether the apparent passage area (A) of the DPF 21 is greater than a first predetermined value (A1)(step S22). When the judged result is YES, i.e., when A is greater than A1, it is so judged that the PM is deposited in small amounts on the DPF 21 and the DPF 21 is still capable of trapping the PM to a sufficient degree. Therefore, the first map group shown in FIG. 6 is specified to conduct the normal operation mode (step S23). Accordingly, the control quantities of FIG. 5 are determined based upon the first map group.

When the judged result at step S22 is NO, i.e., when A is smaller than A1, it is judged whether the apparent passage area (A) of the DPF 21 is greater than a second predetermined value (A2)(step S24). When the judged result is YES, i.e., when A1>A>A2, it is so judged that the DPF 21 be regenerated since the PM is deposited thereon, and the second map group shown in FIG. 6 is specified (first instruction output means: step S25). Accordingly, the control quantities of FIG. 5 are determined based upon the second map group.

Figure 10:
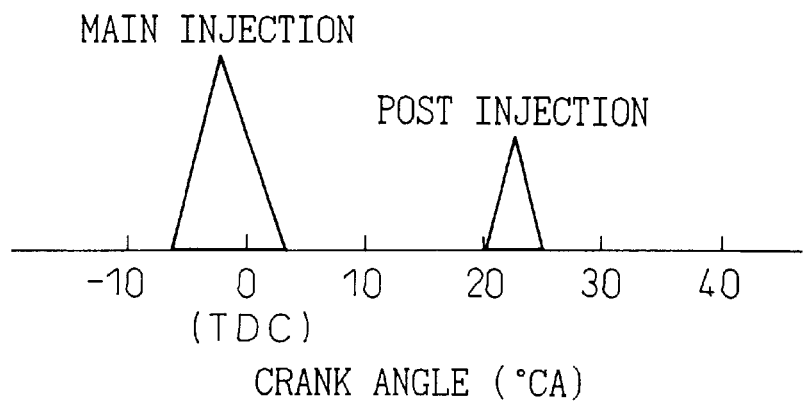
FIG. 10 is a diagram illustrating a main injection timing and a post injection timing with respect to the crank angle.

Here, the second map group shown in FIG. 6 is provided with a post injection for injecting the fuel at an injection timing at a delayed crank angle as shown in FIG. 10 separately from the main injection which is for obtaining the engine output. The post injection elevates the temperature of the exhaust gas, and sends the unburned fuel (HC) to the DPF 21 so as to be reacted with the catalyst on the surface of the DPF 21 to further elevate the temperature. As shown in a graph of FIG. 11, therefore, the DPF 21 is heated to be higher than a temperature (400 to 500° C.), at which the PM is quickly oxidized and burns, and is thus regenerated.

The apparent passage area (A) of the DPF 21 gradually increases owing to the above regeneration processing. The state where the permeability of the DPF 21 is improved is monitored by the flowchart of FIG. 7. When the apparent passage area (A) of the DPF 21 exceeds A6 as will be described later, the operation mode relying upon the second map group is changed over to the operation mode relying upon the first map group, i.e., returned back to the normal operation mode. Thus, when not required, the operation is conducted under the normal operation mode (economy mode), where the exhaust gas temperature is low, and the fuel efficiency is good, to save the fuel.

When the judged result at step S24 is NO, i.e., when A≦A2, it is so judged that the PM is deposited in large amounts on the DPF 21. In this case, if the DPF 21 is heated at a temperature at which large amounts of the PM may be quickly oxidized and is burned, then, the large amounts of the PM burn at one time and the DPF 21 may be overheated and may be melt-broken. To prevent this, therefore, the third map group shown in FIG. 6 is specified (step S26). Accordingly, the control quantities of FIG. 5 are determined based upon the third map group.

Figure 11:
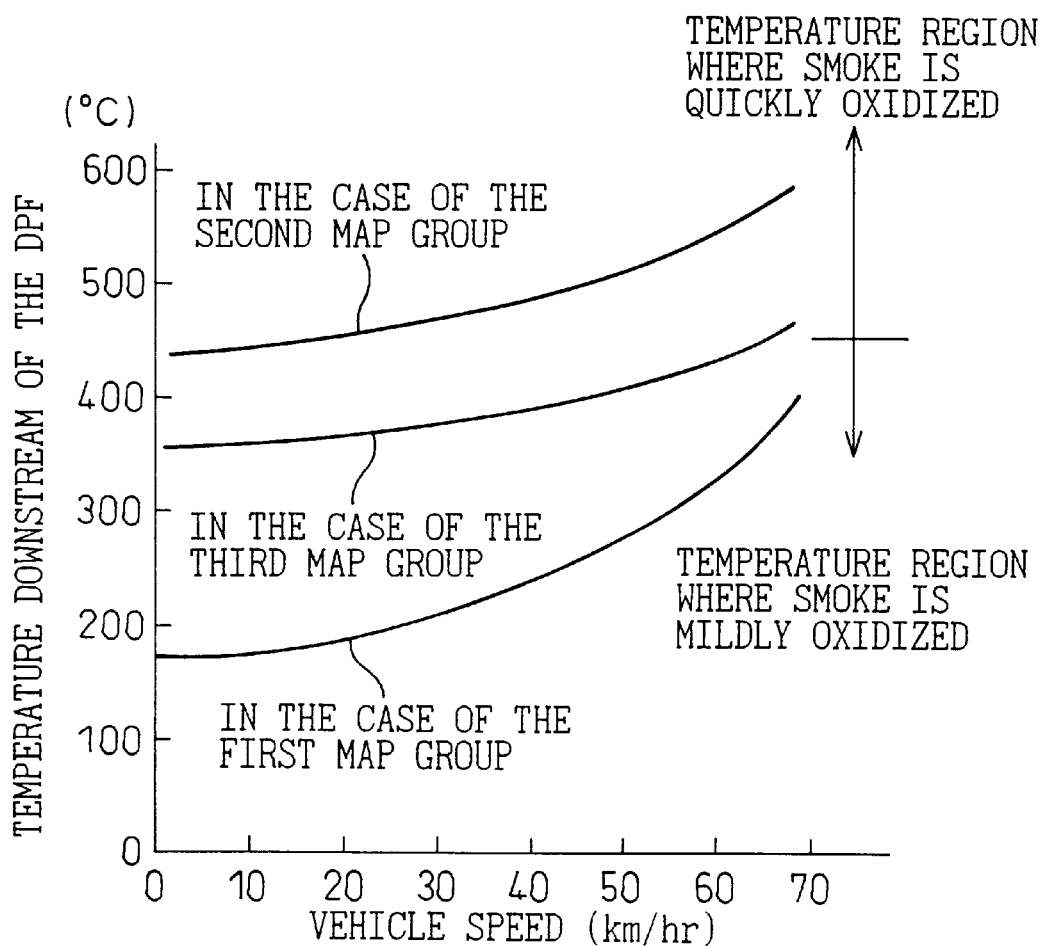
FIG. 11 is a diagram of characteristics illustrating a relationship between the temperatures downstream of the particulate filter (DPF) and the vehicle speeds in the operation modes according to the first to third map groups.

Therefore, the third map group is selected to maintain a temperature (350 to 450° C.) at which the PM is mildly oxidized, so that the DPF 21 is mildly burned and regenerated at a temperature at which the DPF 21 is not overheated and is not melt-broken. At a moment when the apparent passage area (A) of the DPF 2 becomes greater than A2, the second map group is selected and the DPF 21 is regenerated by the above-mentioned method. In the third map group, the amount of post injection shown in FIG. 10 is set to be smaller than that of during the operation mode which is based upon the second map group to obtain characteristics as shown in FIG. 11.

Figure 12:
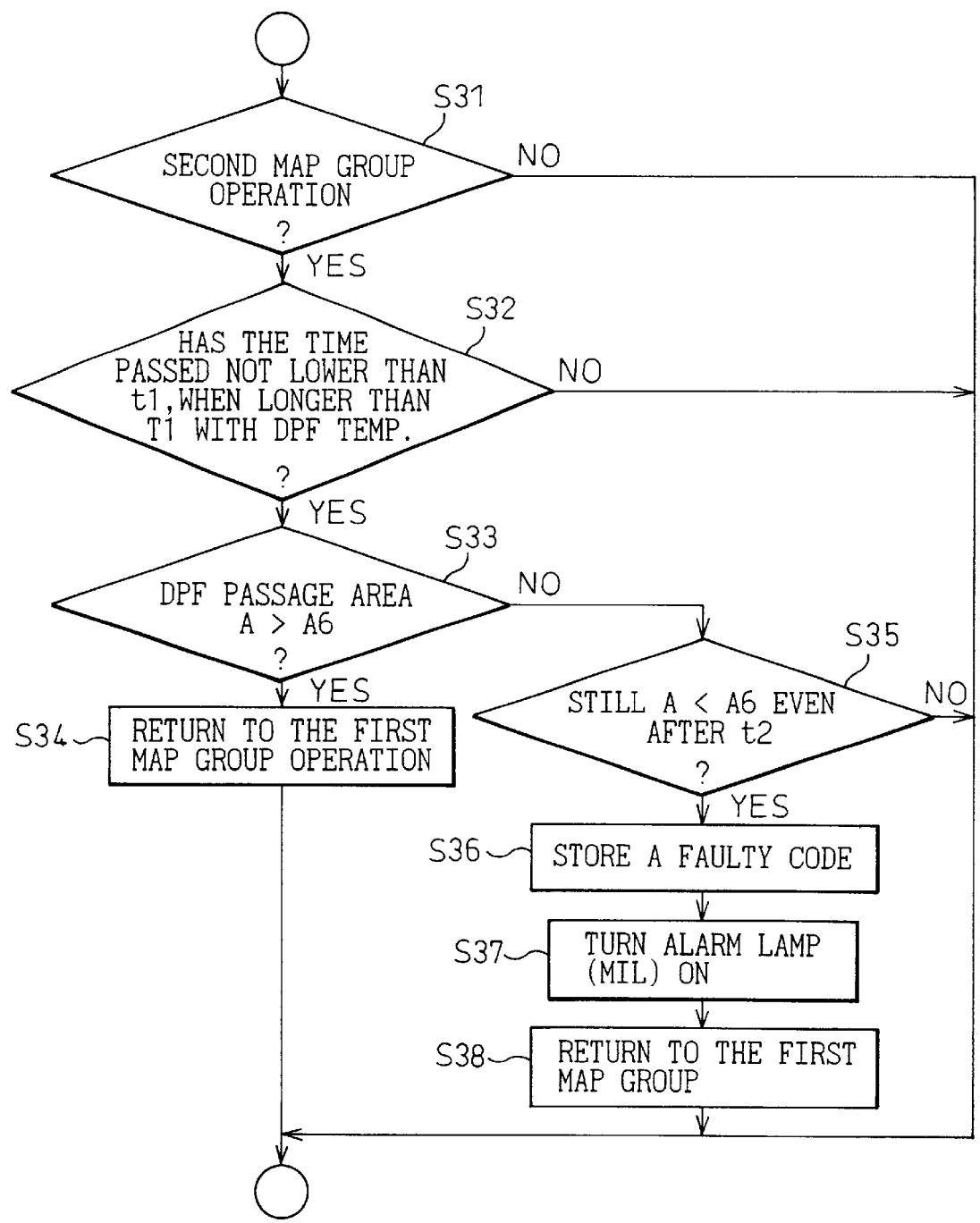
FIG. 12 is a flowchart of a program for changing a regeneration processing mode over to a normal operation mode.

Next, described below is a method of changing the operation conditions to change the DPF 21 regeneration processing mode over to the normal operation mode upon confirming that the permeability of the DPF 21 is brought to the target state (intended state) due to the processing for regenerating the DPF 21. Here, FIG. 12 is a flowchart of a program for changing the regeneration processing mode over to the normal operation mode.

First, it is judged whether the operation mode is based on the second map group, i.e., whether the operation mode is in the DPF 21 regeneration processing mode (step S31). When the judged result is YES, i.e., when the operation is in the DPF 21 regeneration processing mode, the DPF 21 is heated to be higher than a temperature (T1) at which the DPF 21 can be regenerated. It is further judged that whether the time in this state has passed longer than a time (t1) which is long enough for regenerating the DPF 21 (step S32). When the judged result is YES, it is confirmed whether the passage area (A) of the DPF 21 is more recovered than A6 (step S33). When the judged result is YES, the operation mode relying upon the first map group is resumed, and the processing for regenerating the DPF 21 is discontinued (second instruction output means: step S34).

When the judged result at step S33 is NO, it is confirmed whether A is not recovered more than A6 despite the time (t2) that has passed is longer than the time (t1) which is long enough for regenerating the DPF 21 (step S35). when the judged result is YES, i.e., when the apparent passage area (A) is not still recovered more than A6 despite the time (t2) that has passed being longer than the time t1, it is judged that the DPF 21 is clogged or is partly clogged and, whereby a fault code is stored (step S36), an alarm lamp (MIL) 41 is turned on (step S37) to let the driver know the need of having the DPF 21 repaired, and the operation is returned back to the operation mode which is based on the first map group (step S38).

Figure 13:
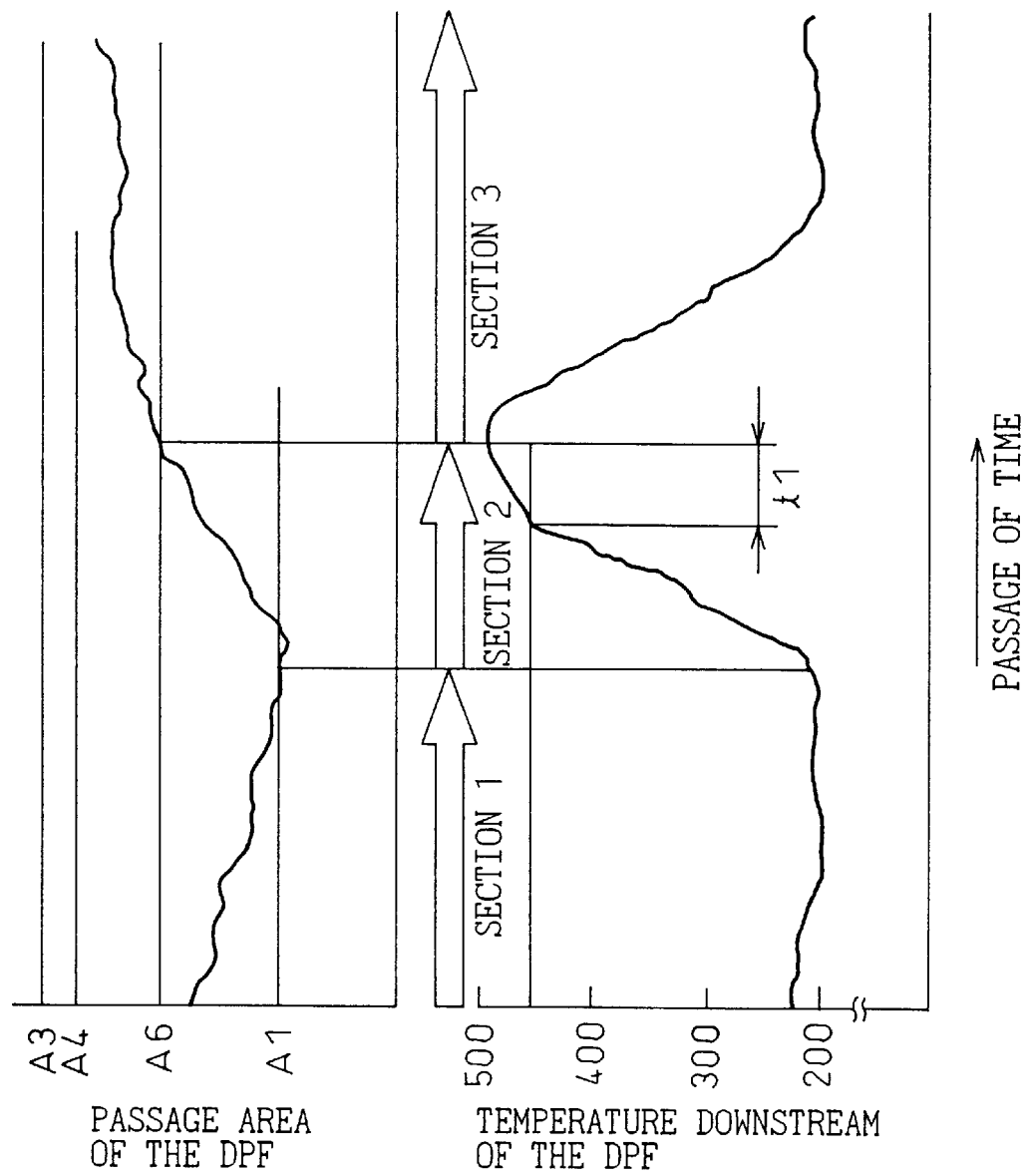
FIG. 13 is a timing chart illustrating a first example of operating the engine by the control operations described above.

FIG. 13 is a diagram illustrating a first example of operating the engine 1 under the above-mentioned control operation. In a section 1, the normal operation mode is conducted and the PM continues to be deposited on the DPF 21. Therefore, the apparent passage area (A) of the DPF 21 decreases with the passage of time. As the apparent passage area (A) of the DPF 21 becomes smaller than A1, the operation mode for regeneration processing is assumed. As seen in a section 2, therefore, the temperature downstream of the DPF 21 is gradually elevated. When the time t1 elapses after the temperature downstream of the DPF 21 has become higher than T1 (set at 450° C. in this embodiment), the apparent passage area (A) of the DPF 21 now exceeds A6. Therefore, the operation is returned back to the normal operation mode. In a section 3, the temperature downstream of the DPF 21 is gradually lowered and becomes stable.

Figure 14:
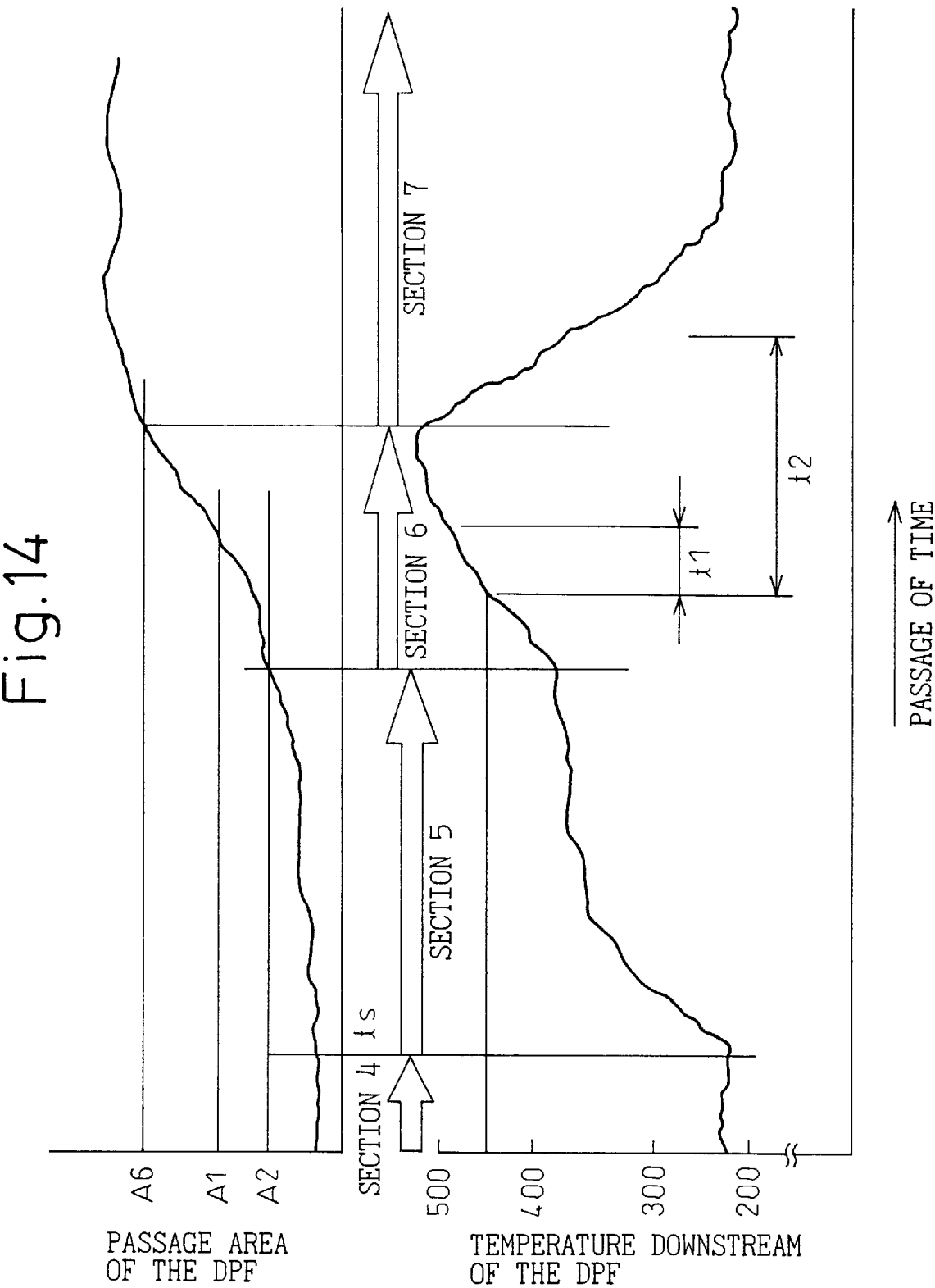
FIG. 14 is a timing chart illustrating a second example of operating the engine by the control operations described above.

FIG. 14 is a diagram illustrating a second example of operating the engine 1 under the above-mentioned control operation. In a section 4, the PM is depositing in large amounts on the DPF 21 without creating the condition for monitoring the apparent passage area (A) of the DPF 21. Accordingly, the apparent passage area (A) of the DPF 21 is greatly decreasing. The apparent passage area (A) is monitored at a timing of being shifted to a section 5, and is judged to be smaller than A2. Therefore, the operation mode relying upon the third map group is selected. The operation is changed over to the operation mode for executing the regeneration processing at a moment when the apparent passage area (A) of the DPF 21, which is being mildly regenerated at about 370° C., becomes greater than A2. In a section 6, the temperature downstream of the DPF 21 further rises to exceed about 450° C. Even after the passage of time t1 under this condition, however, the apparent passage area (A) of the DPF 21 does not still exceed A6. Accordingly, the regeneration processing mode continues. The apparent passage area (A) of the DPF 21 exceeds A6 before the time t2 passes. At this moment, therefore, the operation mode is changed over to the normal operation mode. In a section 7, the temperature downstream of the DPF 21 gradually decreases and becomes stable.

Figure 15:
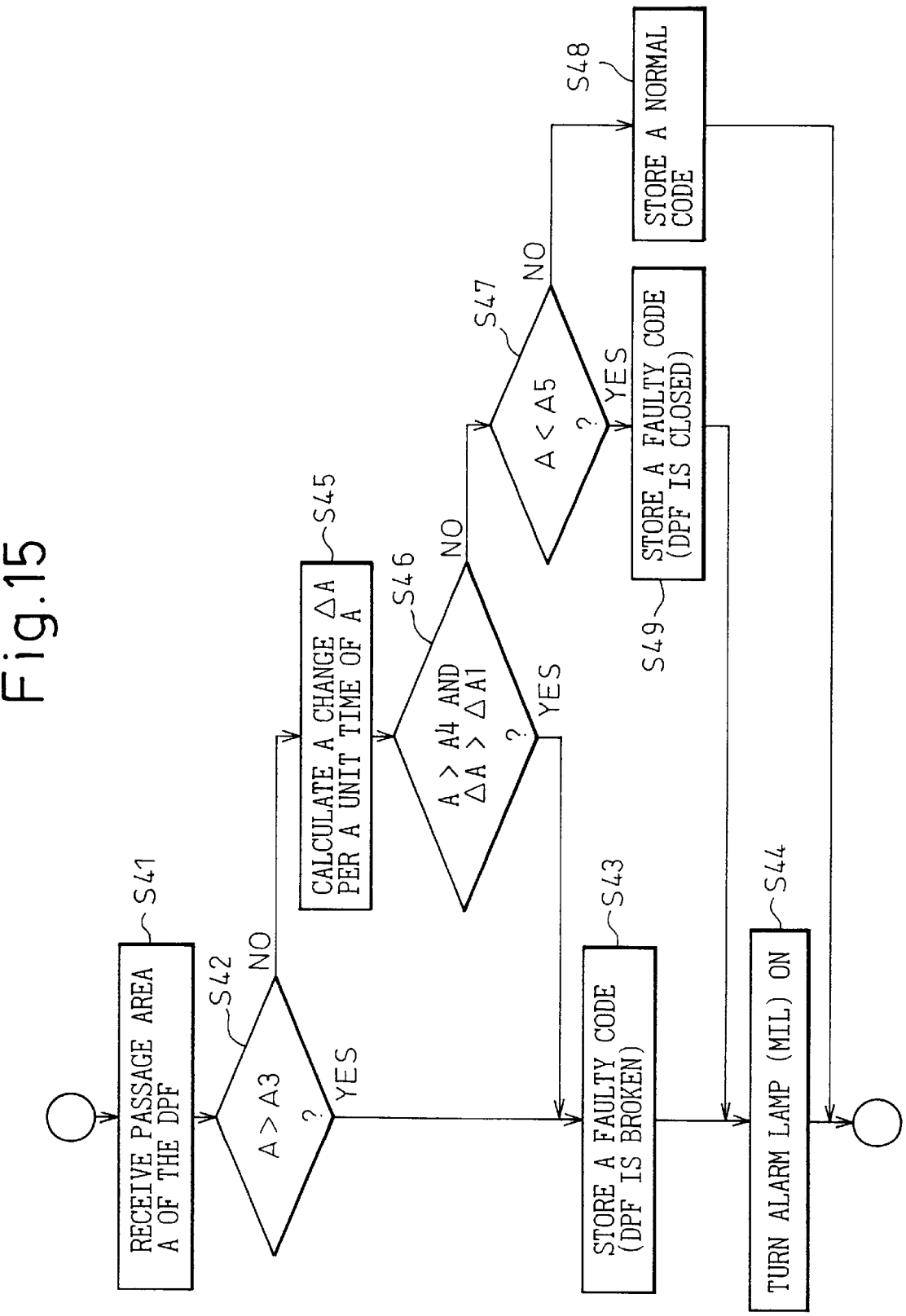

FIG. 15 is a flowchart illustrating a fault-indicating method of turning the alarm lamp 41 on by detecting the faulty state of the DPF 21 from the apparent passage area (A) of the DPF 21.

First, an apparent passage area (A) of the DPF 21 found through the flowchart of FIG. 7 is received (step S41). Next, it is judged whether the apparent passage area (A) of the DPF 21 is greater than a third predetermined value (A3). Namely, it is judged whether the apparent passage area (A) of the DPF 21 is greater than that of the DPF 2 in its early stage of use, i.e., greater than the passage area of the DPF 21 on which no PM is deposited (step S42). When the judged result is YES, i.e., when A>A3, it is so judged that the DPF 21 is broken and that the upstream and the downstream of the DPF 21 is communicated through the cracks, whereby a faulty code representing the breakage of the DPF 21 is stored in the memory (step S43) and the alarm lamp 41 is turned on (step S44) to let the driver know the need to have the DPF 21 repaired.

The breakage could occur in a state where the PM is deposited even when the judged result at step S42 is NO, i.e., even when A≦A3. To correctly detect such an occurrence, therefore, a change (ΔA) in the apparent passage area (A) of the DPF 21 per a unit time is monitored at the same time (step S45), and it is judged whether ΔA has greatly changed (ΔA>ΔA1) within a short period of time and whether the apparent passage area (A) of the DPF 21 is greater than a fourth predetermined value (A4) which is smaller than A3 (step S46). When the judged result is YES, i.e., when ΔA has greatly changed (ΔA>ΔA1) within a short period of time and when the apparent passage area (A) of the DPF 21 is greater than the value A4 which is smaller than A3, it is similarly judged that the DPF 2 is broken and the same processing is executed.

When the judged result at step S46 is NO, it is judged whether the apparent passage area (A) of the DPF 21 is smaller than A5 (step S47). When the judged result is NO, a normal code representing the normal state of the DPF 21 is stored in the memory (step S48).

Figure 16:
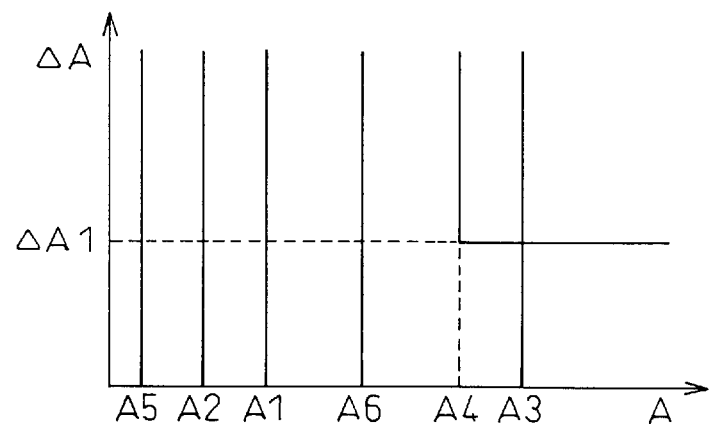
FIG. 16 is a diagram illustrating a relationship among the judged values of the apparent passage areas.
Figure 17:
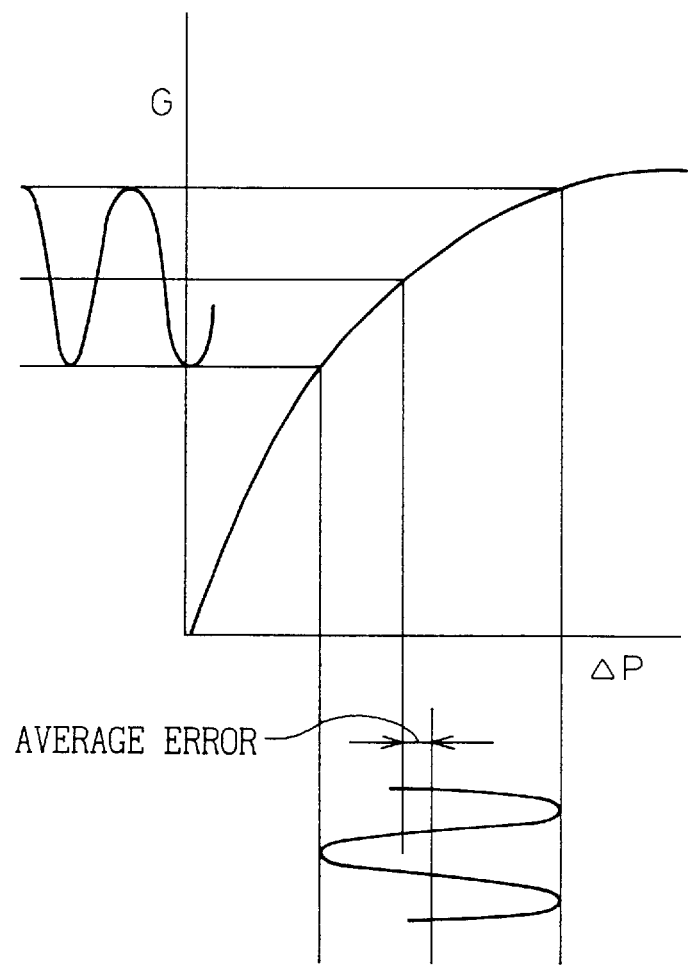
FIG. 17 is a diagram illustrating the occurrence of an average error when it is attempted to find an average value of pressure signals in the presence of a pressure pulsation.

When the judged result at step S47 is YES, i.e., when the passage area is smaller than the passage area (A5) which is very smaller than the passage area of when large amounts of the PM is deposited, it is so judged that the DPF 21 is clogged, a faulty code representing the breakage of the DPF 21 is stored in the memory (step S49) and the alarm lamp 41 is turned on. In this case, the same phenomenon occurs even when the exhaust gas is leaking from the exhaust pipe upstream of the DPF 21. Therefore, the fault mode may be displayed to indicate the clogging of the DPF 21 or the leakage through the exhaust pipe. For easy comprehension of the fault-alarming method, FIG. 16 illustrates a relationship among the judged values of the apparent passage areas described above.

[Effect of the Embodiment]

As described above, the apparent passage area (A) of the DPF 2, that is decreased due to the deposition of the PM on the DPF 21, is detected, and the DPF 21 is regenerated without being unnecessarily heated. Therefore, the DPF 21 is reliably regenerated irrespective of the state where the PM is deposited, requiring a minimum of regenerating time, and the consumption of fuel can be saved. In regenerating the DPF 21, further, the regeneration is executed for a minimum period of time to minimize the consumption of fuel used for the regeneration processing. It is therefore possible to precisely detect the passage area of the exhaust gas passage that is recovered due to the regeneration.

This embodiment provides a method of finding the apparent passage area (A) of the DPF 21 maintaining a sufficient degree of precision, making it possible to precisely detect an abnormal increase in the passage area caused by breakage. Therefore, the state where the DPF 2 is broken and the PM is released to the atmosphere does not last long. It is further made possible to reliably burn the particulate matter and regenerate the DPF 21 without dismantling the DPF 21 and without undesirably overheating the DPF 21 under every operation mode of the engine 1. The DPF 21 is not overheated and is not melt-damaged by the heat of regeneration treatment even when the differential pressure is small between the upstream and the downstream of the DPF 21 as in, for example, the idling state, and even when the PM is deposited in large amounts on the DPF 21 as a result of continuing the operation for extended periods of time under the conditions where a decrease in the passage area (A) due to the deposition of the PM on the DPF 21 cannot be monitored.

The embodiment has dealt with the device 2 for purifying harmful components in the exhaust gas emitted from the engine 1 into harmless components by using a particulate filter carrying an oxidizing catalyst which oxidizes carbon monoxide (CO) and hydrocarbons (HC) in the exhaust gas emitted from the engine 1 to purify them into harmless carbon dioxide ($CO_2$) and water vapor ($H_2O$). However, the device 2 for purifying exhaust gas may employ a particulate filter carrying a three-way catalyst which oxidizes carbon monoxide (CO) and hydrocarbons (HC) in the exhaust gas emitted from the engine 1 and, at the same time, reduces nitrogen oxides (NOx) in order to purify three harmful components in the exhaust gas into harmless carbon dioxide ($CO_2$), water vapor ($H_2O$) and nitrogen ($N_2$).

While the invention has been described by reference to specific embodiments chosen for purposes of illustration, it should be apparent that numerous modifications could be made thereto by those skilled in the art without departing from the basic concept and scope of the invention.

What is claimed is:

1. A device for purifying exhaust gas of an engine, comprising:
   (a) upstream-downstream differential pressure sensor means for detecting a differential pressure between the upstream and the downstream of a particulate filter which traps particulate matter emitted from an automotive engine;
   (b) engine data detector means for detecting a plurality of engine data; and
   (c) passage area calculation means for calculating the apparent passage area of the particulate filter based on said plurality of engine data and on the differential pressure between the upstream and the downstream of the particulate filter, in order to evaluate the permeability of the particulate filter, wherein said passage area calculation means includes a step of correcting an average error caused by the pulsation of the exhaust gas pressure at the time of finding the apparent passage area by using the differential pressure between the upstream and the downstream of the particulate filter.

2. A device for purifying exhaust gas of an engine according to claim 1, further comprising an alarm means for generating an alarm when it is judged that the apparent passage area is greater than a predetermined value or is smaller than a predetermined value.

3. A device for purifying exhaust gas of an engine according to claim 2, wherein said alarm means also takes into consideration that the rate of increase in the apparent passage area is greater than a predetermined ratio.

4. A device for purifying exhaust gas of an engine according to claim 1, wherein, as the plurality of engine data, there are selected not less than three of the flow rate of the air taken in by the automotive engine, temperature of the exhaust gas, temperature of the particulate filter, atmospheric pressure and flow rate of the fuel.

5. A device for purifying exhaust gas of an engine according to claim 1, wherein said engine data detector means has intake air amount detector means for detecting the flow rate of the air taken in by the automotive engine, and said passage area calculation means discontinues the step of calculating the apparent passage area when the flow rate of the intake air detected by said intake air amount detector means is smaller than a predetermined value.

6. A device for purifying exhaust gas of an engine, comprising:
   (a) upstream-downstream differential pressure sensor means for detecting a differential pressure between the upstream and the downstream of a particulate filter which traps particulate matter emitted from an automotive engine;
   (b) engine data detector means for detecting a plurality of engine data;
   (c) passage area calculation means for calculating the apparent passage area of the particulate filter based on said plurality of engine data and on the pressure differential between the upstream and the downstream of the particulate filter, in order to evaluate the permeability of the particulate filter;
   (d) filter regeneration processing means for regenerating said particulate filter based upon an instruction;
   (e) first instruction output means that sends an instruction for regenerating said particulate filter to said filter regeneration processing means when it is judged, based upon said apparent passage area, that the particulate matter is deposited on said particulate filter and that said particulate filter be regenerated; and
   (f) second instruction output means that sends an instruction for ending the regeneration processing for the particulate filter to said filter regeneration processing means when it is confirmed that the regeneration processing for the particulate filter is finished.

7. A device for purifying exhaust gas of an engine according to claim 6, wherein said passage area calculation means includes a step of correcting an average error caused by the pulsation of the exhaust gas pressure at the time of finding the apparent passage area by using the differential pressure between the upstream and the downstream sides of the particulate filter.

8. A device for purifying exhaust gas of an engine according to claim 6, wherein, as the plurality of engine data, there are selected not less than three of the flow rate of the air taken in by the automotive engine, temperature of the exhaust gas, temperature of the particulate filter, atmospheric pressure and flow rate of the fuel.

9. A device for purifying exhaust gas of an engine according to claim 6, wherein said engine data detector means has intake air amount detector means for detecting the flow rate of the air taken in by the automotive engine, and said passage area calculation means discontinues the step of calculating the apparent passage area when the flow rate of the intake air detected by said intake air amount detector means is smaller than a predetermined value.

10. A device for purifying exhaust gas of an engine according to claim 6, wherein said filter regeneration processing means is an operating condition change-over means for changing the operating conditions of the automotive engine toward a direction in which the exhaust gas temperature is elevated and the particulate filter is heated based upon an instruction for regenerating said particulate filter, and said second instruction output means so instructs said operating condition change-over means that the operating conditions for the automotive engine be returned back to the initial operating conditions when it is confirmed that the particulate filter regeneration processing is finished.

11. A device for purifying exhaust gas of an engine according to claim 10, wherein when said first instruction output means has judged an extreme drop in the apparent passage area, said operating condition change-over means changes the operating conditions to heat said particulate filter at a temperature at which said particulate matter deposited on said particulate filter mildly reacts.

* * * * *